United States Patent
Miller et al.

[11] Patent Number: 6,119,020
[45] Date of Patent: Sep. 12, 2000

[54] MULTIPLE USER SIM CARD SECURED SUBSCRIBER UNIT

[75] Inventors: Michael Addison Miller, Chandler; James Morris Tooker, Phoenix, both of Ariz.

[73] Assignee: Motorola, Inc., Schaumburg, Ill.

[21] Appl. No.: 08/991,578

[22] Filed: Dec. 16, 1997

[51] Int. Cl.[7] .............................. H04B 1/38; H04M 1/00; H04M 1/66; H04M 3/16

[52] U.S. Cl. .......................... 455/558; 455/410; 455/411

[58] Field of Search ................................. 455/558, 411, 455/410, 550; 379/144; 235/382, 486

[56] References Cited

U.S. PATENT DOCUMENTS

| | | | |
|---|---|---|---|
| 4,868,846 | 9/1989 | Kemppi | 379/144 |
| 5,404,580 | 4/1995 | Simpson et al. | 455/558 |
| 5,418,837 | 5/1995 | Johansson et al. | 379/357 |
| 5,444,764 | 8/1995 | Galecki | 455/411 |
| 5,497,411 | 3/1996 | Pellerin | 455/411 |
| 5,687,216 | 11/1997 | Svensson | 379/357 |
| 5,875,404 | 2/1999 | Messiet | 455/558 |
| 5,884,168 | 3/1999 | Kolev et al. | 455/551 |
| 5,907,804 | 5/1999 | Schroderus et al. | 455/411 |
| 5,913,175 | 6/1999 | Pinault | 455/558 |

FOREIGN PATENT DOCUMENTS 0 607 767 A1  7/1994  European Pat. Off. .......... G07F 7/10

*Primary Examiner*—Dwayne D. Bost
*Assistant Examiner*—Raymond B Persino
*Attorney, Agent, or Firm*—Bradley J. Botsch

[57] ABSTRACT

A subscriber unit (101) includes a SIM card reader (107) for receiving a SIM card (105). The subscriber unit (101) is serialized and has stored therein an alphanumeric signature value which is associated with the specific serialized subscriber unit (101). The subscriber unit (101) is fully operable only with a SIM card (105) having stored therein the specific signature value corresponding to the serialized subscriber unit (101). A user having a SIM card (105) containing the specific signature value for that subscriber unit can select a mode of user operation which will permit multiple selected SIM card holding users to use the subscriber unit.

5 Claims, 5 Drawing Sheets

MULTIPLE USER SIM CARD SECURED SUBSCRIBER UNIT

FIELD OF THE INVENTION

The present invention pertains to communication systems, in general, and to personal communication devices or subscriber units used in such communications systems and of a type utilizing a Subscriber Identification Module (SIM), in particular.

BACKGROUND OF THE INVENTION

In radiotelephone systems such as the Global System for Mobile Communications (GSM) radiotelephone system in use in Europe, a SIM card is inserted into a radiotelephone for providing subscriber identification, billing information and other information concerning the operation of the radiotelephone. The SIM is a key component of the GSM and typically comprises a card which is inserted into a GSM phone in order to make the phone work.

In a typical cellular telephone communication system, each subscriber unit is assigned a mobile subscriber identification (MSI) which uniquely identifies the subscriber unit from other subscriber units. In the European cellular communication system, one such identifier is the international mobile subscriber identification number (IMSI).

It is highly desirable to provide a personal communication system which utilizes a personal telecommunications device or subscriber unit which is operable in various available telecommunications systems across all available cellular frequencies and which is operable with satellite based communication systems such as the Iridium based communications system from Motorola Inc.

In the present telecommunications environment, SIM cards are used to allow the SIM card holder to have access to any telecommunications device such as a cellular telephone which will receive the SIM card. The SIM card is used primarily to provide a customer profile from which the customer may be billed for usage of the telecommunications network. Thus, the SIM card is used to authenticate or authorize a user.

With the advent of subscriber units which are useable in satellite systems and across other systems as well, it is desirable to provide for limited use of subscriber units. In certain circumstances it is desirable to allow a subscriber unit to be used only by a single user. In other instances it is desirable that a single user decides additional specific users who are permitted to use the subscriber unit. By providing these security features, the incidence of theft or misappropriation of subscriber units may be decreased.

BRIEF DESCRIPTION OF THE DRAWING

The invention will be better understood from a reading of the following detailed description in conjunction with the drawing in which like reference designators are used to designate like elements and in which.

DETAILED DESCRIPTION

The present invention associates each subscriber unit with a preset and predetermined signature alphanumeric value. The predetermined alphanumeric value is programmed in to the memory on a SIM card. The subscriber unit is thereafter uniquely associated with the particular SIM card. Full operability subscriber unit can only occur if the particular SIM card associated with the subscriber unit is used in conjunction with the subscriber unit. For purposes of clarity, the SIM card containing the predetermined alphanumeric signature value associated with a specific subscriber unit is referred to as a primary SIM card for that subscriber unit.

In accordance with one aspect of the invention, a user having a primary SIM card can access a menu in the subscriber unit which permits the primary SIM card holder to enter the signature values of other SIM cards authorized to enable operation of the subscriber unit.

In accordance with another aspect of the invention a subscriber unit is operable in a selectable single/multiple user mode. When in the multiple user mode, the subscriber unit will function with any SIM card which is formatted for operation within the particular subscriber unit and which the subscriber unit has been programmed with the predetermined alphanumeric values programmed into the SIM cards. Thus multiple users may use a single subscriber unit. When in the single user mode, the subscriber unit will function with the primary SIM card which is formatted for operation within the particular subscriber unit. By providing these modes of operation, a subscriber unit may be used for commercial use while also providing for personal users of the same type of subscriber units to prevent unauthorized use of the subscriber unit. Additionally, single mode operation offers a form of theft deterrence for would be thieves of subscriber units without SIM cards. A subscriber unit set up in the single user mode is rendered useless without a proper primary SIM card.

U.S. Pat. Nos. 5,615,260; 5,257,414 and 5,444,764 all issued to Motorola, Inc., the assignee of the present invention, are incorporated herein by reference.

Figure 1:
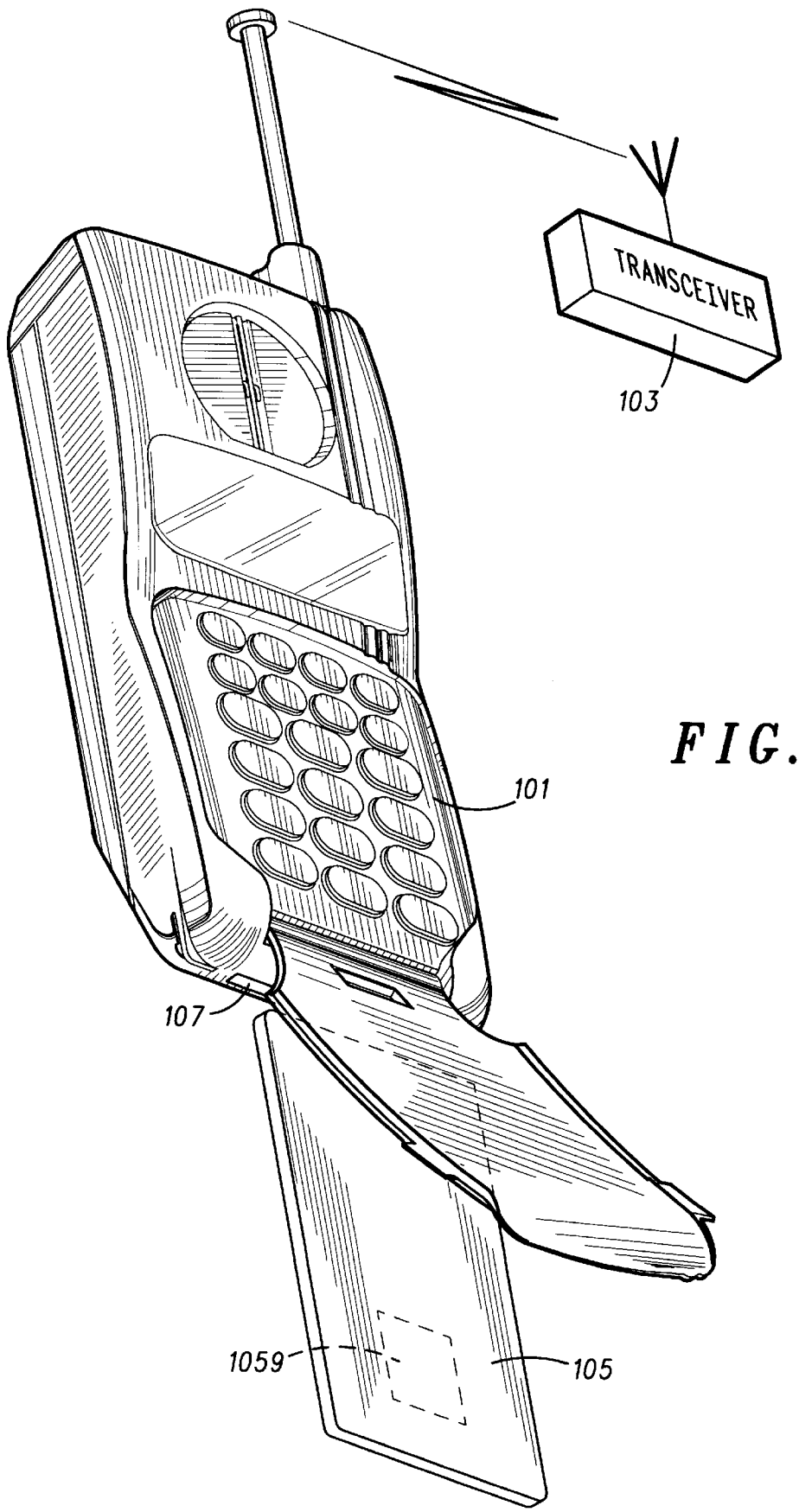
FIG. 1 illustrates a subscriber unit in accordance with the invention.

FIG. 1 illustrates a subscriber unit in accordance with the principles of the invention. The subscriber unit of FIG. 1 is a radiotelephone. Radiotelephones such as the one shown in FIG. 1 are also known as cellular telephones, personal communication devices and subscriber units. It is intended that the term "subscriber unit" as used herein encompasses all such devices and equivalents thereof. It is also intended that the term "subscriber unit" as used herein is not limited to personal communication devices and subscriber units that are wireless. A transceiver 103 transmits and receives radio frequency (rf) signals to and from mobile and portable subscriber units located within a geographic service area. In the case where a conventional cellular telephone system is the system being used, transceiver 103 is a fixed site transceiver and the geographic service area is fixed as the cell served by transceiver 103. In the instance of a satellite type system, such as GSM or Iridium™, transceiver 103 may be a low earth orbiting satellite. Subscriber unit 101 is one of a plurality of subscriber units served by transceiver 103. The rf signals transmitted between transceiver 103 and subscriber unit 101 include data or voice signals, subscriber identification and billing information. The billing information sent from subscriber unit 101 to transceiver 103 is stored in a memory contained on SIM card 105. SIM card 105 can be a full size card such as shown in FIG. 1 or can be a chip sized card. Subscriber unit 101 contains a card reader which reads the subscriber billing information from SIM card 105. The card reader may be of a type described in U.S. Pat. No. 5,615,260.

Figures 2, 3, 4:
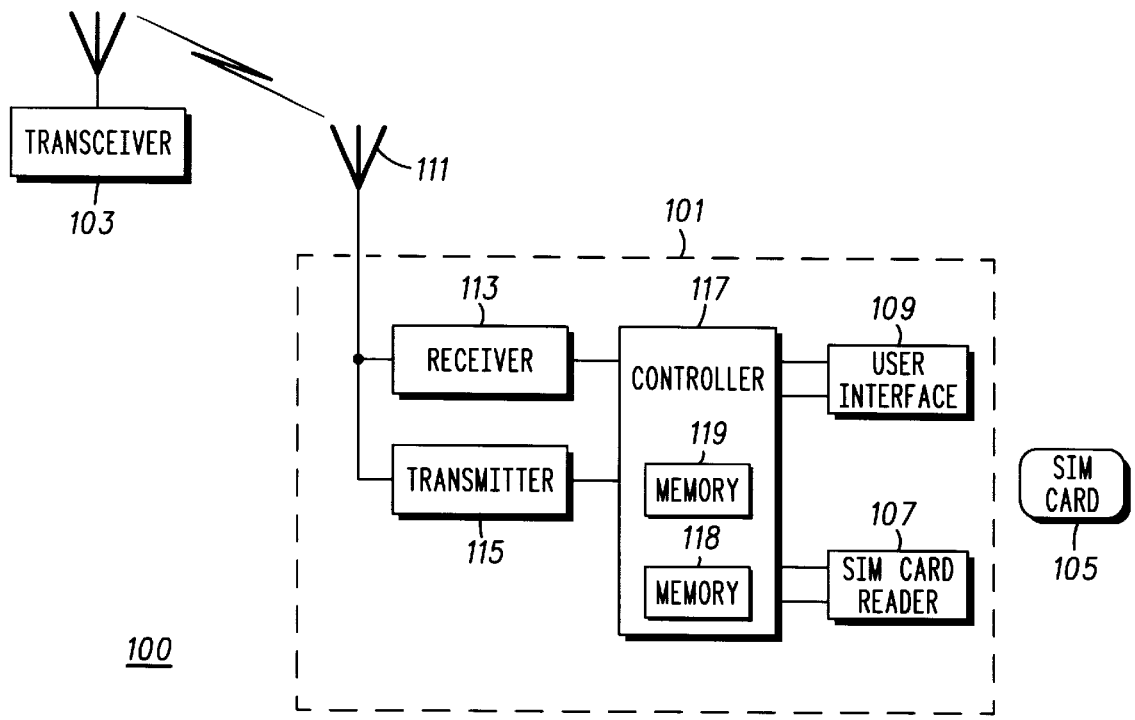
FIG. 2 is a block diagram of the subscriber unit of FIG. 1.
FIG. 3 is a translation table of serial numbers to signature values.
FIG. 4 is a table of user modes for the device of FIG. 1.

FIG. 2 illustrates the system of FIG. 1 with subscriber unit 101 shown in block diagram form. SIM card 105 may be inserted into SIM card reader 107 contained within the subscriber unit 101. A typical subscriber unit 101 includes a transceiver portion comprising a transmitter 115 and a receiver 113 both coupled to an antenna 111 to provide communication to the transceiver 103. Subscriber unit 101 includes a controller or processor unit 117. Controller 117 includes a microprocessor, such as a commercially available processor identified as an MC68332 which is available from Motorola, Inc., and memory which includes a program memory 119 and a random access memory 118. Memories 118 and 119 are shown as separate memory modules. It will be appreciated by those skilled in the art that the memories 118 and 119 can be portions of a common memory. Program memory 119 is non volatile memory which, for example, is an EEPROM and includes operational programs for operating subscriber unit 101. Memory 118 is a random access memory of the nonvolatile type. As will also be appreciated by those skilled in the art, memory 118 can be any of a number of commercially available memory types. Subscriber unit 101 also includes a user interface 109. User interface 109 is used to convey information between a user and subscriber unit 101. In the illustrative embodiment of the invention, user interface 109 includes a microphone, a speaker, a data port, a display and a keypad none of which is separately shown in the drawings for purposes of clarity. As will be understood by those skilled in the art that the display and keypad may be of any type used to input information and the display may be any of the types available for use in subscriber units.

In using subscriber unit 101, information inputted at user interface 109 as voice and/or data signals may be processed by controller 117. The processed signals are provided to transmitter 115 which converts the information into rf signals or modulates rf signals with the processed information for transmission via antenna 111 to transceiver 103. The rf signals received at transceiver 103 are demodulated to extract the information which in the case of a cellular telephone system is then transmitted over the terrestrial based telephone network. In the case where the transceiver 103 is a satellite based transceiver, the rf signals will be processed in accordance with the satellite system standards. Similarly, receiver 113 receives signals from antenna 111 which were transmitted from transceiver 103. Controller 117 processes the signals and extracts voice and/or data from the signals and provides the voice and/or data to user interface 109.

Subscriber unit 101 includes a "signature value" stored in the memory 119 to uniquely identify the subscriber unit 101. The signature value is assigned at the manufacturer or distributor subscriber unit. For purposes of this disclosure, it is intended that the term "manufacturing" includes the assigning of the signature value to the subscriber unit 101 and as explained below to a SIM card 105. The signature value is stored in the subscriber unit 101 as an alphanumeric identity which corresponds to a particular serial number for a subscriber unit 101. This mode is referred to herein as "open" mode 405 which allows any number to be dialed whereby an emergency number may be dialed without a SIM.

Turning to FIG. 3, an exemplary table of serial numbers and the corresponding signature values are shown in tabular form. The serial numbers 301, 303 and 305 are indicated in the left column and the signature values 302, 304 and 306 corresponding to each serialized subscriber unit is indicated in the right column. Of particular interest to the present invention, for each subscriber unit 101 a SIM card 105 is also programmed with the signature value corresponding to that subscriber unit 101. For each subscriber unit 101 a primary SIM card 105 having the corresponding signature value is required in order for the subscriber unit 101 to be made operable. Thus, associated with each serialized radiotelephone there is a corresponding serialized SIM card 105 which acts as a key to enable operation of the subscriber unit 101. As shown in FIG. 3 there is a one to one correspondence between the subscriber unit serial numbers and the subscriber unit signature values. The signature values are typically alphanumeric combinations, however, it will be apparent that the signature values may be solely alphabetic or numeric or may include specific characters. The term "alphanumeric" as used herein is intended to include combinations which are numeric only, or alphabetic only or which include unique characters.

In accordance with the principles of the invention, a subscriber unit may be operable in one or more modes. The illustrative embodiment of the invention is operable in three modes. The various modes of operability for a subscriber unit are illustrated in FIG. 4. For a particular subscriber unit corresponding to the subscriber unit having the serial number 301 listed on the first line of the table of FIG. 3 the corresponding signature value 302 is preprogrammed into the subscriber unit. The signature value 302 is also preprogrammed into a primary SIM card. Only if the primary SIM card is inserted as SIM card 105 into the subscriber unit 101 of FIG. 1 will subscriber unit 101 be operable for any mode of operation. The subscriber unit 101 is otherwise inoperable. It will be appreciated by those skilled in the art that the subscriber unit can also be preprogrammed to permit access to use without any SIM card for emergency number calls such as to emergency fire or police numbers. The forgoing mode of operation is referred to herein as a "single" user mode 401. A primary SIM card 105 enables a user to access all modes of operation of subscriber unit 101.

A user with a primary SIM card 105 may program subscriber unit 101 to be operated with multiple SIM cards 105. This is referred to herein as the "multiple" user mode 403. In the multiple user mode, the SIM card signature values for other SIM cards 105 permitted to have use of the subscriber unit 101 are entered into the subscriber unit 101. Thus the signature values 402 of allowable SIM cards 105 are stored in the subscriber unit 101. In addition, a subscriber unit 101 may be programmed to permit any valid SIM card to be used to activate a subscriber unit 101 for a limited number of user modes such as access to emergency telephone numbers such as police or fire numbers. This mode is referred to herein as the "open" mode 405.

Figure 5:
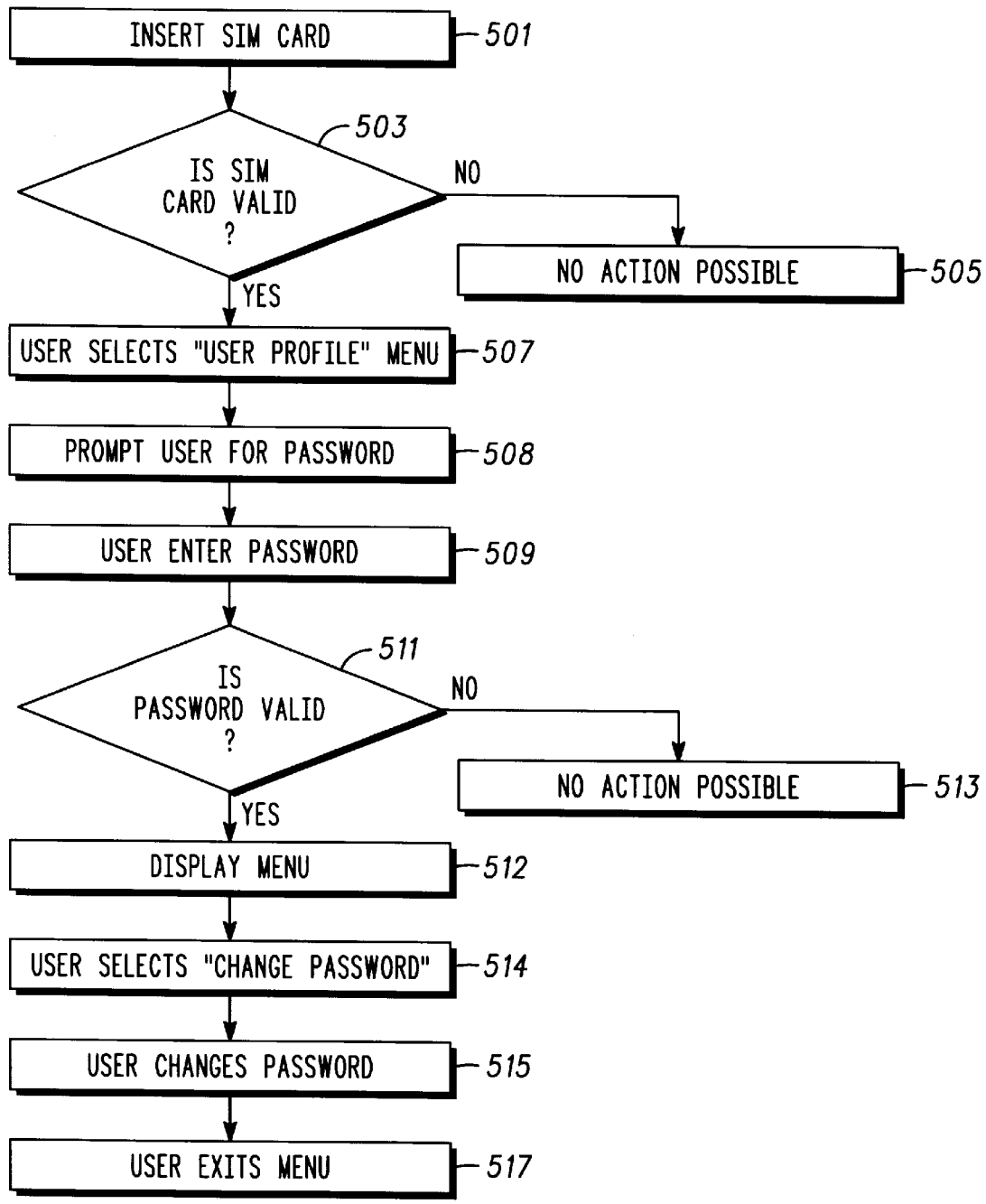
FIGS. 5 through 7 are flow charts illustrating the operation of the radiotelephone system of FIG. 1.

FIG. 5 is a flow chart of operation of a subscriber unit 101 to change a password for accessing features of the subscriber unit. A SIM card 105 is first inserted into the subscriber unit 101 as indicated at step 501. Subscriber unit 101 makes a determination of whether SIM card 105 is valid or nor at step 503. The validity determination is made from information stored on the SIM card 105. More specifically, the signature value stored in the SIM card 105 is compared against the signature value for a primary SIM card stored for the subscriber unit and against a list of authorized signature values also stored in memory 119 as shown in FIG. 2. If SIM card 105 is not valid, no use of the subscriber unit 101 is permitted and the subscriber unit 101 provides a display indication that access to use of the subscriber unit 101 is denied as indicated at 505. If SIM card 105 is valid, a menu is displayed using the user interface 109 of the subscriber unit as shown in FIG. 1. The user may select options from the menu including the selection of a "user profile" selection as indicated at step 507. The user profile selection option is used to set specific user settings for the user. Examples of such settings include ring options and volume, preprogrammed numbers and similar operational options for the subscriber unit 101. The selection of the operational options is stored in memory 118. Before these options can be changed, subscriber unit 101 prompts the user for a password as indicated at step 508. The user must enter a password as indicated at step 509. The password may be alpha, numeric or alphanumeric depending upon the type and capability of the subscriber unit. Subscriber unit 101 determines whether the password entered is valid or not at step 511. If the password entered is not valid, no further action is possible with the subscriber unit 101 as indicated at step 513. If the password entered is a valid password for the subscriber unit 101, a menu of operation choices is displayed as indicated at step 512. The menu displayed includes as one choice a "change password" option. If the user selects the change password option as indicated at step 514, the user can then change the password as indicated in step 515. The user can only change the password for the SIM card 105 inserted in the subscriber unit 105. After changing the password, the user exits the change password menu as indicated at step 517. The use of password protection in the unit is to provide a second level of security in the event, for example, that the subscriber unit and matching SIM card are stolen or lost. In addition, it is significant to note that in the embodiment of the invention, a user can only change his or her own password and cannot change the password of any other authorized user. It is to be noted that the functionality attributed above and below to the subscriber unit 101 is provided by controller 117 utilizing programs and data stored in the memories 118 and 119. It is to be noted that each SIM card 105 includes a memory 1059 which stores the subscriber value for the SIM card 105.

Figure 6:
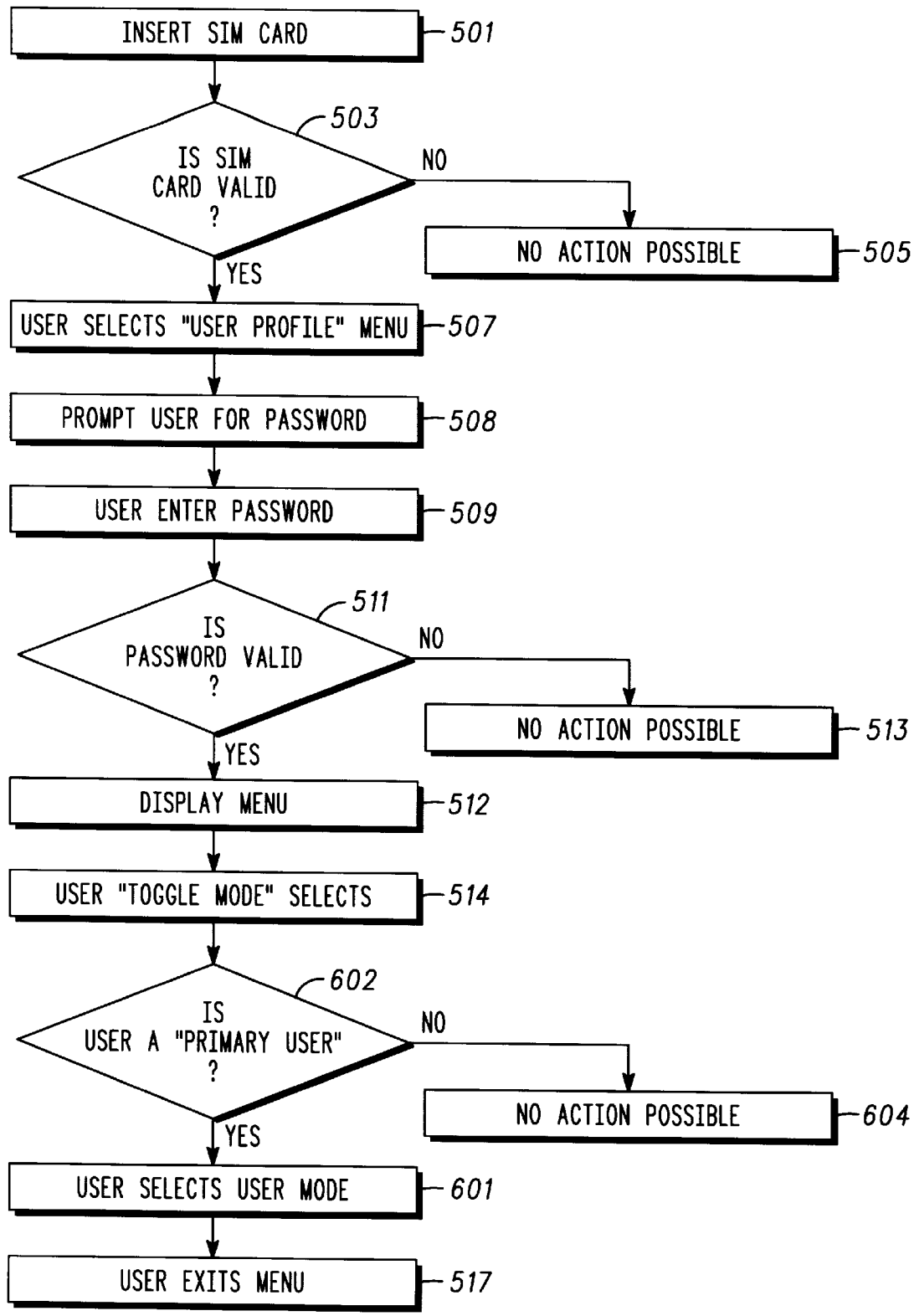

FIG. 6 is a flow chart of operation of the subscriber unit 101 for toggling the operation of the subscriber unit such that it is changed from the single user to the multiple user mode or vice versa. The operation is the same as set forth above for steps 501 through 512. One of the menu choices is to select the "toggle" mode. If the user selects the "toggle" mode in step 514, the subscriber unit will determine if the SIM card is a primary SIM card in step 602. If the SIM card 105 is not a primary SIM card 105 further access to menu functions is denied in step 604. If the SIM card 105 is determined to be a primary SIM card, then the toggle mode menu item is entered into at step 601 and the user mode can be toggled. When the user mode is toggled it is switched from its present user mode which may be either one of the single or multiple open mode to the other of the three modes. Thus, a user having a primary SIM card 105 can determine whether the subscriber unit 101 is to be useable only with the primary SIM card 105 or is useable with other SIM cards.

Figure 7:
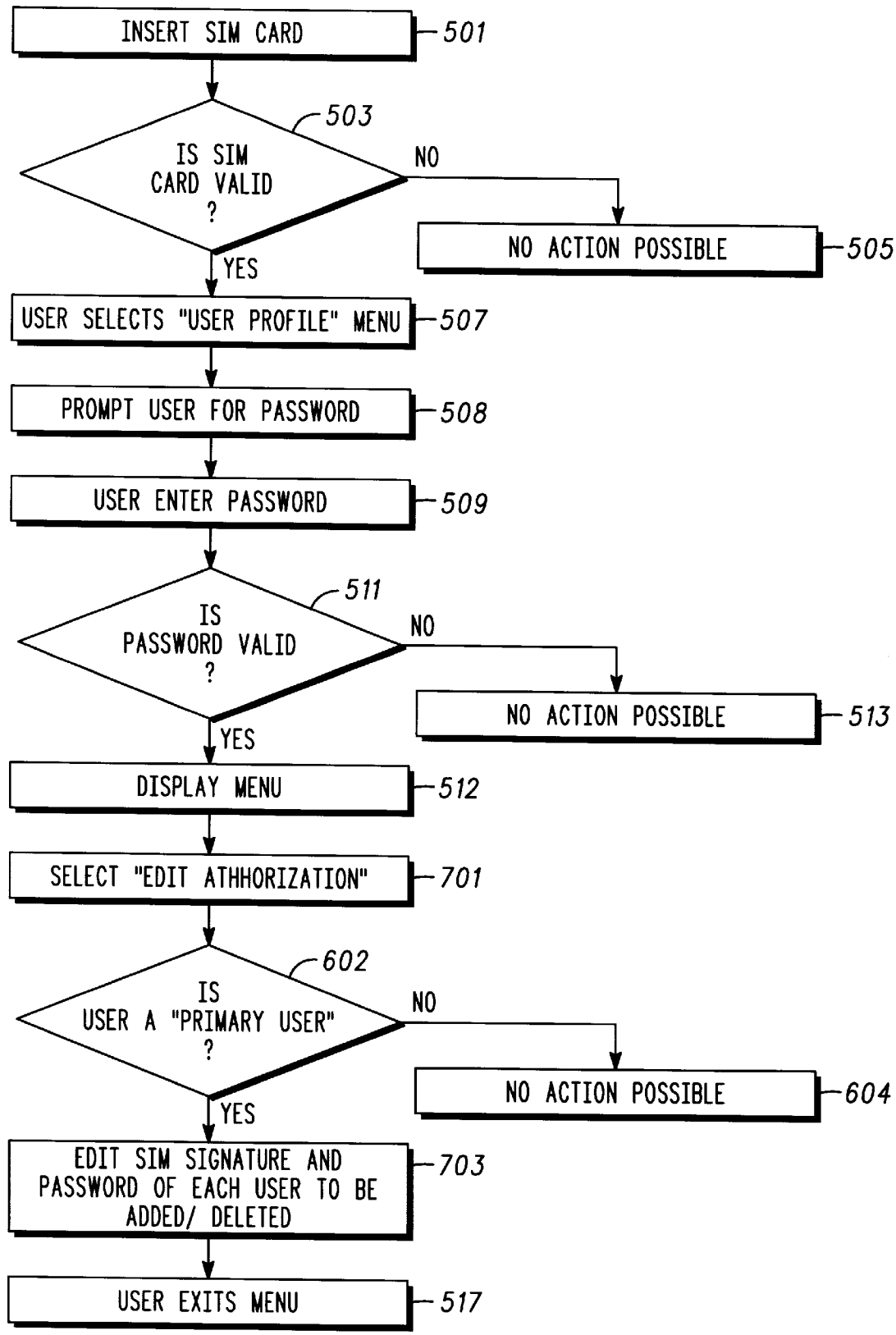

FIG. 7 is a flow diagram of the operation of editing the subscriber unit 101 list of authorized SIM cards. Operation of the subscriber unit 101 is the same for steps 501 through 512 as described with respect to FIG. 5. From the menu displayed in step 512, the user selects the "edit authorized users" mode in step 714. Prior to allowing the user to edit the list of authorized SIM cards, the subscriber unit 101 will determine whether the SIM card 105 is a primary SIM card in step 602. If the SIM card 105 is not a primary SIM card, further access is denied as indicated in step 604. If the SIM card 105 is a primary SIM card, the user is permitted to edit the SIM signature value and password of each user to be added or deleted from a list of authorized users in step 716. After making the selections, the user exits the menu in step 517.

The invention has been described in terms of a specific embodiment. It will be appreciated by those skilled in the art that various modifications and changes may be made to the illustrative embodiment of the invention without departing from the spirit of scope of the invention. It is intended that the invention not be limited by the embodiments shown and described. It is intended that the invention be limited only by the claims appended hereto.

What is claimed is:

1. A method of operating a subscriber unit having a SIM card reader, said method comprising the steps of:

reading a first preprogrammed signature value from a primary SIM card;

comparing said first preprogrammed signature value to a preprogrammed signature value stored in said subscriber unit, said preprogrammed signature value being singularly unique to said subscriber unit;

enabling communications functions of said subscriber unit only if said first preprogrammed signature value read from said primary SIM card corresponds to said first preprogrammed signature value stored in said subscriber unit;

requiring a user to enter a password;

comparing said user entered password with one or more passwords stored in said subscriber unit, said password stored in said subscriber unit being uniquely assigned to said primary SIM card; and permitting entry of additional signature values of one or more additional authorized SIM cards only if said user entered password corresponds to one of said stored passwords.

2. A method in accordance with claim 1, wherein:

said first preprogrammed signature value for said primary SIM card is determined by a provider of said subscriber unit.

3. A method in accordance with claim 1, comprising:

maintaining said communications functions operable for as long as said primary SIM card or said one or more additional authorized SIM cards is readable by said subscriber unit and disabling said communication functions if said primary SIM card or said additional authorized SIM cards becomes unreadable by said subscriber unit.

4. A subscriber unit useable with a SIM card, comprising:

a SIM card reader for receiving and reading information stored on said SIM card;

a display means for prompting a user to enter a password;

user means for said user to enter a user password;

a memory storing a predetermined first signature value, said predetermined first signature value being unique to said subscriber unit, said memory also storing a user password for said SIM card;

a controller for comparing a signature value stored on said SIM card with said predetermined first signature value stored in said memory, said controller denying access to at least certain functions of said subscriber unit if said signature value of said SIM card does not match said predetermined first signature value, said controller allowing access to substantially all functional operability of said subscriber unit if said signature value of said SIM card matches said predetermined first signature value; and said controller comparing said user entered password with said stored user password and permitting entry of additional signature values of one or more additional authorized SIM cards only if said user entered password matches said stored user password.

5. A subscriber unit in accordance with claim 4, wherein: said password stored on said subscriber unit corresponds uniquely to said SIM card.

* * * * *